(12) United States Patent
Aoyama (10) Patent No.: US 9,340,463 B2
(45) Date of Patent: May 17, 2016

(54) HONEYCOMB STRUCTURE

(71) Applicant: NGK Insulators, Ltd., Nagoya (JP)

(72) Inventor: Tomokatsu Aoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 223 days.

(21) Appl. No.: 14/200,818

(22) Filed: Mar. 7, 2014

(65) Prior Publication Data

US 2014/0272279 A1   Sep. 18, 2014

(30) Foreign Application Priority Data

Mar. 18, 2013   (JP) ................... 2013-055647

(51) Int. Cl.
| | |
|---|---|
| *C04B 38/00* | (2006.01) |
| *B01D 46/24* | (2006.01) |
| *C04B 35/111* | (2006.01) |
| *C04B 35/185* | (2006.01) |
| *C04B 35/195* | (2006.01) |
| *C04B 35/565* | (2006.01) |
| *C04B 35/587* | (2006.01) |
| *C04B 111/00* | (2006.01) |

(52) U.S. Cl.
CPC .......... *C04B 38/0009* (2013.01); *B01D 46/247* (2013.01); *B01D 46/2429* (2013.01); *C04B 35/111* (2013.01); *C04B 35/185* (2013.01); *C04B 35/195* (2013.01); *C04B 35/565* (2013.01); *C04B 35/587* (2013.01); *B01D 2046/2496* (2013.01); *C04B 2111/0081* (2013.01); *C04B 2235/3217* (2013.01); *C04B 2235/3218* (2013.01); *C04B 2235/349* (2013.01); *C04B 2235/3418* (2013.01); *C04B 2235/6021* (2013.01); *C04B 2235/6567* (2013.01); *C04B 2235/77* (2013.01); *C04B 2235/94* (2013.01); *Y10T 428/24149* (2015.01); *Y10T 428/24165* (2015.01)

(58) Field of Classification Search
None
See application file for complete search history.

(56) References Cited

U.S. PATENT DOCUMENTS

| | | | | | |
|---|---|---|---|---|---|
| 4,448,828 | A | * | 5/1984 | Mochida et al. | 428/116 |
| 6,159,431 | A | * | 12/2000 | Inoue et al. | 428/116 |
| 6,656,564 | B2 | * | 12/2003 | Ichikawa et al. | 428/116 |
| 2009/0291836 | A1 | * | 11/2009 | Ohno et al. | 502/68 |
| 2012/0251767 | A1 | * | 10/2012 | Ishikawa et al. | 428/116 |

FOREIGN PATENT DOCUMENTS

JP    H11-277653 A    10/1999

* cited by examiner

*Primary Examiner* — David Sample
*Assistant Examiner* — Nicholas W Jordan
(74) *Attorney, Agent, or Firm* — Burr & Brown, PLLC (57) ABSTRACT

A honeycomb structure includes a honeycomb structure body constituted of a first region which is an inside region and a second region which is an outside region surrounding a periphery of the first region. An open area ratio in the first region is 83% or more and a porosity of partition walls is from 20 to 60%. A thickness $t_1$ of the partition walls constituting the first region is 0.11 mm or less, a thickness $t_2$ of the partition walls constituting the second region is larger than the thickness $t_1$ of the partition walls, a ratio ($t_3/t_1$) between a thickness $t_3$ of the partition walls forming first complete cells from the outermost periphery of the honeycomb structure body toward a center thereof in the second region and the thickness $t_1$ of the partition walls is from 1.2 to 1.4, and a partition wall strength index A is 4.0 or more.

9 Claims, 4 Drawing Sheets

HONEYCOMB STRUCTURE

The present application is an application based on JP-2013-55647 filed on Mar. 18, 2013 with the Japanese Patent Office, the entire contents of which are incorporated herein by reference.

BACKGROUND OF THE INVENTION

1. Field of the Invention

The present invention relates to a honeycomb structure. More particularly, it relates to a honeycomb structure capable of suppressing cell deformation while realizing the lowering of a heat capacity and the decrease of a pressure loss.

2. Description of Related Art

In an exhaust gas discharged from an internal combustion engine such as an engine of a car, harmful substances such as carbon monoxide (CO), hydrocarbons (HC) and nitrogen oxides ($NO_x$) are included. When these harmful substances are decreased to purify the exhaust gas, a catalyst reaction is broadly used. In this catalyst reaction, the generating of another harmless substance from a harmful substance such as carbon monoxide (CO) can be realized by simple means for bringing the exhaust gas into contact with a catalyst. Therefore, in the car or the like, the catalyst is usually disposed in the middle of an exhaust system, thereby performing the purification of the exhaust gas.

When the catalyst is disposed in the exhaust system of the car or the like, a honeycomb catalyst body onto which the catalyst is loaded onto a honeycomb structure is used. In the honeycomb catalyst body, a honeycomb configuration is formed by partition walls onto which the catalyst is loaded. Therefore, in the honeycomb catalyst body, a frequency of the contact between the exhaust gas and the catalyst is high, with the result that a high purification efficiency of the exhaust gas can be realized.

In recent years, concerning the honeycomb structure, the lowering of a heat capacity and the decrease of a pressure loss have further been required. To meet this requirement, the honeycomb structure in which a thickness of the partition walls is decreased to obtain a high open area ratio has been demanded. However, in the honeycomb structure of the high open area ratio, the problem occurs that a structural strength of the honeycomb structure weakens.

Thus, there has been suggested a high strength thin wall honeycomb structure in which a thickness of partition walls of an outer peripheral portion is regulated to heighten the structural strength while decreasing the thickness of the partition walls to realize a high open area ratio (an open area ratio of 80% or more) (Patent Document 1).

[Patent Document 1] JP-A-H11-277653

SUMMARY OF THE INVENTION

However, in the above-mentioned high strength thin wall honeycomb structure, when a higher open area ratio is further intended, there is the fear that a structural strength of the honeycomb structure deteriorates to cause the shape change of cells (cell deformation).

Moreover, in recent years, for the purpose of the enhancement of productivity (the reduction of costs), an amount of a material to be extruded per unit time during the formation of the honeycomb structure has been larger than before, and during the extrusion of the material, a difference in flow speed (a flow speed distribution) is easily made in a diametric direction of a formed body. Therefore, a degree of production difficulty is higher than before, and the shape change of the cells (the cell deformation) tends to occur more easily.

In view of the above-mentioned problems, an object of the present invention is to provide a honeycomb structure in which even in the case of a high open area ratio, a structural strength does not easily deteriorate and the shape change of cells does not easily occur.

According to the present invention, there is provided a honeycomb structure described in the following.

According to a first aspect of the present invention, a honeycomb structure including a honeycomb structure body having partition walls to define and form a plurality of cells extending from a first end surface as one end surface to a second end surface as the other end surface to become through channels of a fluid is provided, wherein in a cross section perpendicular to an extending direction of the cells, the honeycomb structure body is constituted of a first region which is an inside region and a second region which is an outside region surrounding a periphery of the first region, and in the cross section perpendicular to the cell extending direction, the cells of a part positioned in the outermost periphery of the honeycomb structure body among the plurality of cells are incomplete cells in which a part of an outer periphery of a cross section of each of the cells has a shape along an outer peripheral shape of the honeycomb structure body, the cells other than the incomplete cells among the plurality of cells are complete cells having a polygonal sectional shape in the cross section perpendicular to the cell extending direction, the second region is from a region having a width corresponding to three cells in terms of the number of the complete cells from the outermost periphery of the honeycomb structure body toward a center thereof to a region having a width corresponding to 20 cells in terms of the number of the complete cells from the outermost periphery toward the center, an open area ratio in the first region of the honeycomb structure body is 83% or more, a porosity of the partition walls is from 20 to 60%, a thickness $t_1$ of the partition walls constituting the first region is 0.11 mm or less, a thickness $t_2$ of the partition walls constituting the second region is larger than the thickness $t_1$ of the partition walls, a value ($t_3/t_1$) of a ratio between a thickness $t_3$ of the partition walls forming the first complete cells from the outermost periphery of the honeycomb structure body toward the center thereof in the second region and the thickness $t_1$ of the partition walls is from 1.2 to 1.4, a partition wall strength index A represented by Equation (1) described in the following in the first region is 4.0 or more, $$A = t_1^2/Ls^2 \times 1000, \quad \text{Equation (1):}$$

where A is the partition wall strength index, and Ls is a partition wall central portion length (mm), and when intersecting portions of the partition walls are rounded intersecting portions having a round shape, Ls is calculated in accordance with Equation (2), $$Ls = p - t_1 - (Is - 2^{1/2} t_1)/(2^{1/2} - 1), \quad \text{Equation (2):}$$

where p is a cell pitch (mm), and Is is a diagonal width (mm) in each of the rounded intersecting portions.

According to a second aspect of the present invention, the honeycomb structure according to the above first aspect is provided, wherein at least one of the intersecting portions of the partition walls is the rounded intersecting portion having the round shape, and the diagonal width Is in the rounded intersecting portion is from 1.5 to 5.5 times the thickness $t_1$.

According to a third aspect of the present invention, the honeycomb structure according to the above first or second aspects is provided, wherein the open area ratio in the first region of the honeycomb structure body is 88% or more.

According to a fourth aspect of the present invention, the honeycomb structure according to any one of the above first to third aspects is provided, wherein the second region is from the region having the width corresponding to the three cells in terms of the number of the complete cells from the outermost periphery of the honeycomb structure body toward the center thereof to a region having a width corresponding to ten cells in terms of the number of the complete cells from the outermost periphery toward the center.

According to a fifth aspect of the present invention, the honeycomb structure according to any one of the above first to fourth aspect is provided, wherein in the cross section perpendicular to the cell extending direction, the sectional shape of the complete cells is one of a square shape, a rectangular shape, a rhombic shape and a hexagonal shape.

According to a sixth aspect of the present invention, the honeycomb structure according to any one of the above first to fifth aspects is provided, wherein the honeycomb structure body is made of a ceramic material containing one or more selected from the group consisting of cordierite, alumina, mullite, silicon nitride, and silicon carbide.

According to the honeycomb structure of the present invention, the above-mentioned relation between the thickness $t_1$ of the partition walls and the thickness $t_2$ of the partition walls, the above-mentioned relation between the thickness $t_1$ of the partition walls and the thickness $t_3$ of the partition walls and the above-mentioned partition wall strength index A of 4.0 or more in the first region are satisfied, whereby even in the open area ratio of 83% or more, a structural strength does not easily deteriorate, and the shape change of the cells does not easily occur.

DETAILED DESCRIPTION OF THE INVENTION

Hereinafter, embodiments of the present invention will be described with reference to the drawings. The present invention is not limited to the following embodiments, and changes, modifications or improvements can be added thereto without departing from the gist of the present invention.

Figure 1:
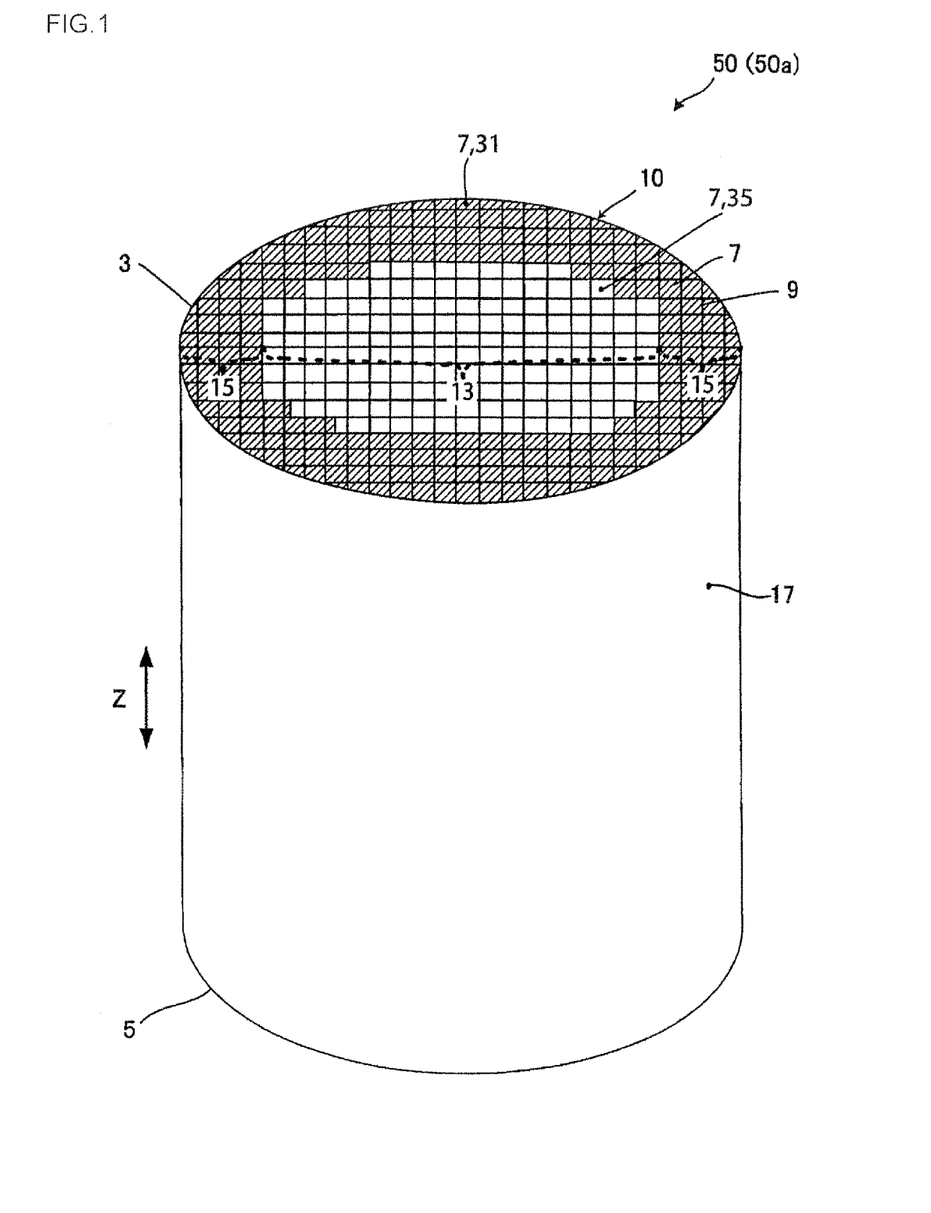
FIG. 1 is a schematic perspective view of one embodiment of a honeycomb structure of the present invention.
Figure 2:
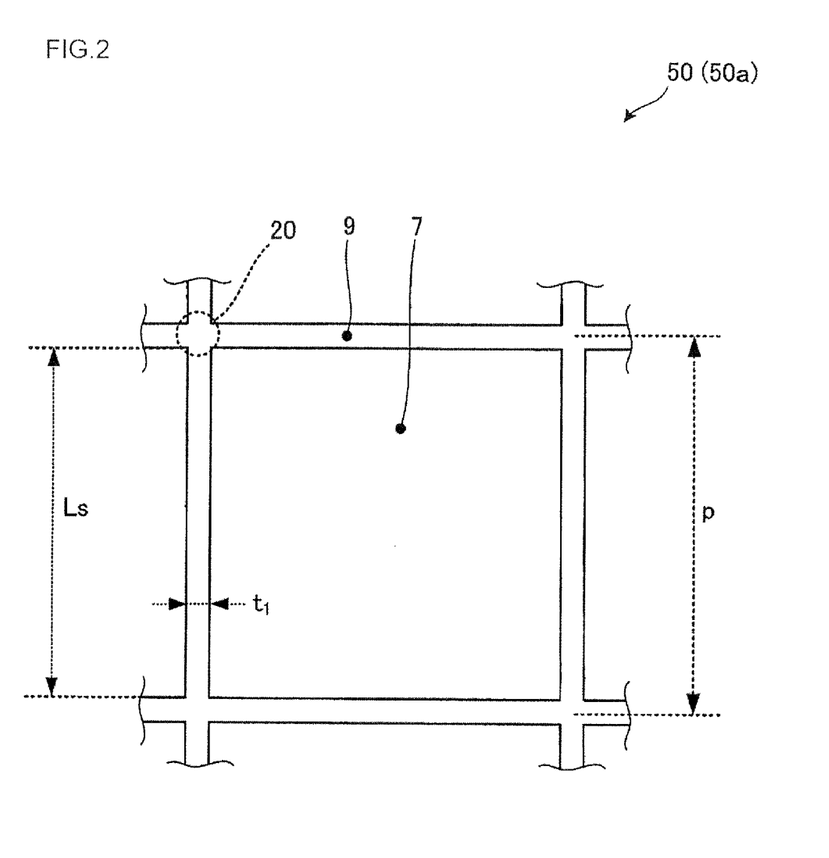
FIG. 2 is a schematic view showing an enlarged cell in a cross section perpendicular to a cell extending direction of the one embodiment of the honeycomb structure of the present invention.
Figure 3:
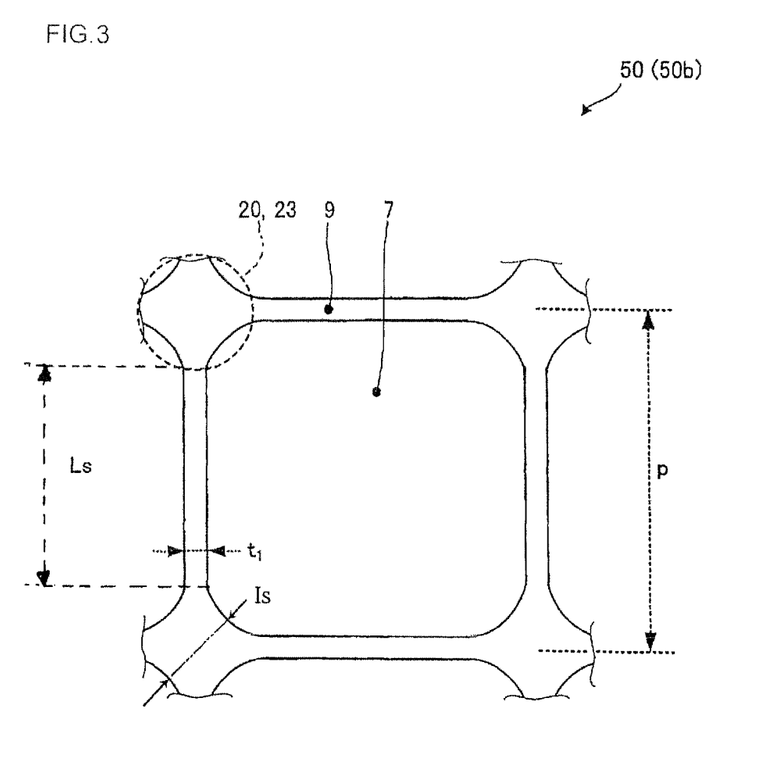
FIG. 3 is a schematic view showing an enlarged cell in a cross section perpendicular to a cell extending direction of another embodiment of the honeycomb structure of the present invention.

1. Honeycomb Structure:

As shown in FIG. 1 to FIG. 3, a honeycomb structure 50 (50a) of one embodiment of the present invention includes a honeycomb structure body 10. The honeycomb structure body 10 have partition walls 9 to define and form a plurality of cells 7 extending from a first end surface 3 as one end surface to a second end surface 5 as the other end surface to become through channels of a fluid. Furthermore, in a cross section perpendicular to an extending direction of the cells 7 (hereinafter simply referred to as "a Z-direction", the honeycomb structure body 10 is constituted of a first region 13 which is an inside region and a second region 15 which is an outside region surrounding a periphery of the first region. In the cross section perpendicular to the Z-direction, the cells 7 of a part positioned in the outermost periphery of the honeycomb structure body 10 among the plurality of cells 7 are incomplete cells 31 in which a part of an outer periphery of a cross section of each of the cells 7 has a shape along an outer peripheral shape of the honeycomb structure body 10. Furthermore, the cells 7 other than the incomplete cells 31 among the plurality of cells 7 are complete cells 35 having a polygonal sectional shape in the cross section perpendicular to the Z-direction. Furthermore, the second region 15 is from a region having a width corresponding to three cells in terms of the number of the complete cells 35 from the outermost periphery of the honeycomb structure body 10 toward a center thereof to a region having a width corresponding to 20 cells in terms of the number of the complete cells 35 from the outermost periphery toward the center. An open area ratio in the first region 13 of the honeycomb structure body 10 is 83% or more. A porosity of the partition walls 9 in the honeycomb structure body 10 is from 20 to 60%. Furthermore, a thickness $t_1$ of the partition walls 9 constituting the first region 13 is 0.11 mm or less. Furthermore, a thickness $t_2$ of the partition walls 9 constituting the second region 15 is larger than the thickness $t_1$ of the partition walls 9 constituting the first region 13. Furthermore, a value ($t_3/t_1$) of a ratio between a thickness $t_3$ of the partition walls 9 forming the first complete cells 35 from the outermost periphery of the honeycomb structure body 10 toward the center thereof in the second region 15 and the thickness $t_1$ of the partition walls 9 in the first region 13 is from 1.2 to 1.4. Furthermore, a partition wall strength index A represented by Equation (1) described in the following in the first region 13 is 4.0 or more, $$A = t_1^2/Ls^2 \times 1000, \qquad \text{Equation (1):}$$

where A is the partition wall strength index, and Ls is a partition wall central portion length (mm). It is to be noted that when intersecting portions of the partition walls are rounded intersecting portions having a round shape, Ls is calculated in accordance with Equation (2), $$Ls = p - t_1 - (Is - 2^{1/2} t_1)/(2^{1/2} - 1), \qquad \text{Equation (2):}$$

where p is a cell pitch (mm), and Is is a diagonal width (mm) in each of the rounded intersecting portions.

Figure 4:
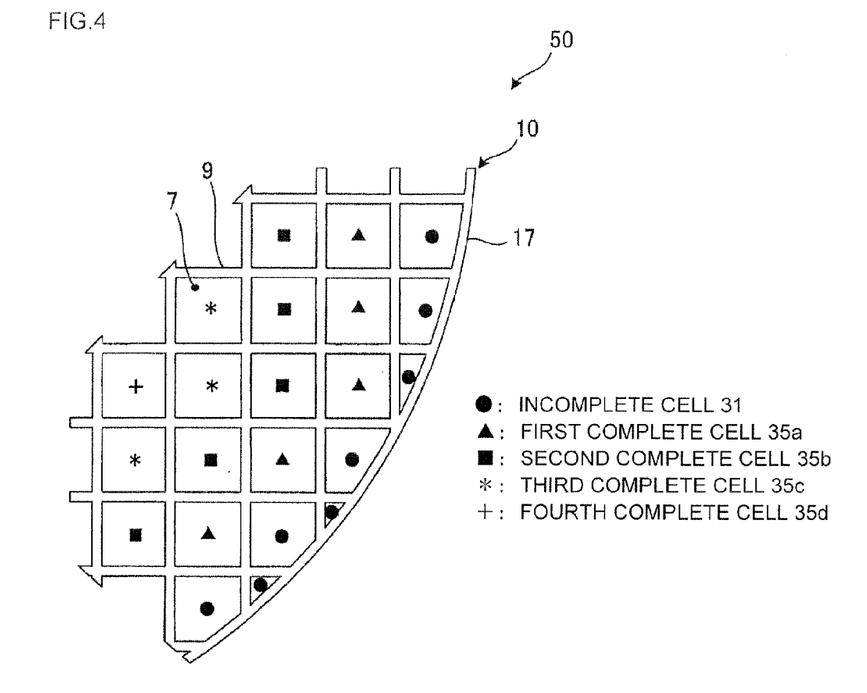
FIG. 4 is an explanatory view concerning a width in terms of the number of the cells from the outermost periphery of a honeycomb structure body toward the center thereof.

It is to be noted that FIG. 1 is a schematic perspective view of the honeycomb structure 50 (50a) of one embodiment of the present invention seen from the side of the first end surface 3. FIG. 2 is a schematic view showing the enlarged cell 7 in the cross section perpendicular to the Z-direction of the honeycomb structure 50a of the one embodiment of the present invention. FIG. 3 is a schematic view showing an enlarged cell 7 in a cross section perpendicular to a Z-direction of a honeycomb structure 50b of another embodiment of the present invention. FIG. 4 is an explanatory view concerning the incomplete cells 31 and the complete cells 35, and a width in terms of the number of the complete cells 35 from the outermost periphery (an outer peripheral wall 17) of the honeycomb structure body 10 toward the center thereof.

In the honeycomb structure 50, the above-mentioned relation between the thickness $t_1$ of the partition walls 9 and the thickness $t_2$ of the partition walls 9, the above-mentioned relation between the thickness $t_1$ of the partition walls 9 and the thickness $t_3$ of the partition walls 9 and the above-mentioned partition wall strength index A of 4.0 or more in the first region 13 are satisfied, whereby even in the open area ratio of 83% or more, the shape change of the cells 7 does not easily occur, and a structural strength does not easily deteriorate. It is to be noted that in a conventional honeycomb structure, in the case of the open area ratio of 83% or more, the shape change of the cells 7 easily occurs especially during formation, and the structural strength deteriorates sometimes. As a result, a formation speed needs to be lowered.

In FIG. 4, the incomplete cells 31 are shown by black circles. As shown in the drawing, as to the incomplete cells 31, a part of the outer periphery of the cross section of each of the incomplete cells 31 has a shape along the outer peripheral shape of the honeycomb structure body 10 in the cross section perpendicular to the Z-direction. In the incomplete cells 31 shown in FIG. 4, a part of the outer periphery of each of the incomplete cells 31 has a shape along a shape of the outer peripheral wall 17.

In FIG. 4, first complete cells 35a from the outermost periphery of the honeycomb structure body 10 toward the center thereof (hereinafter simply referred to as "the first complete cells 35a") are shown by black triangles (it is to be noted that "second" and subsequent complete cells will similarly be referred to as "second complete cells 35b" and the like). The first complete cells 35a are first adjacent to the incomplete cells 31 via the partition walls 9 sometimes. Differently from this case, as to the first complete cells 35a, a vertex of a polygonal shape constituting the cross section of the first complete cell 35a just matches the outer peripheral wall 17 sometimes. When the vertex of the polygonal shape constituting the cross section of the first complete cell 35a just matches the outer peripheral wall 17, the incomplete cell 31 is not sandwiched between the first complete cell 35a and the outer peripheral wall 17.

The complete cells 35 adjacent to the first complete cells 35a via the partition walls 9 are the second complete cells 35b. Furthermore, similarly also as to the third and subsequent complete cells 35, the complete cell 35 adjacent to the n-th complete cell 35 via the partition wall 9 is defined as "the n+1-th complete cell 35 in terms of the number of the complete cells 35 from the outermost periphery toward the center". In FIG. 4, third complete cells 35c are shown by asterisks, and a fourth complete cell 35d is shown by a plus symbol.

For example, when "the second region 15 is the region having the width corresponding to the three cells in terms of the number of the complete cells 35 from the outermost periphery of the honeycomb structure body 10 toward the center thereof", the incomplete cell 31 and the complete cells 35a, 35b and 35c in FIG. 4 are the cells 7 constituting the second region. The complete cells 35d are the cells 7 constituting the first region 13. In the honeycomb structure 50a shown in FIG. 1, the second region 15 is the region having the width corresponding to the three cells in terms of the number of the complete cells 35 from the outermost periphery of the honeycomb structure body 10 toward the center thereof. In FIG. 1, the cells 7 constituting the second region 15 are shown by hatching. Furthermore, when "the second region 15 is a region having a width corresponding to four cells in terms of the number of the complete cells 35 from the outermost periphery of the honeycomb structure body 10 toward the center thereof", the incomplete cell 31 and the complete cells 35a to 35d in FIG. 4 are the cells 7 constituting the second region 15.

In the honeycomb structure 50, the second region 15 may be any region from "the region having the width corresponding to the three cells in terms of the number of the complete cells 35 from the outermost periphery of the honeycomb structure body 10 toward the center thereof" to "the region having the width corresponding to the 20 cells in terms of the number of the complete cells 35 from the outermost periphery of the honeycomb structure body 10 toward the center thereof".

Especially, in the honeycomb structure 50, the second region 15 is preferably from the region having the width corresponding to the three cells in terms of the number of the complete cells 35 from the outermost periphery of the honeycomb structure body 10 toward the center thereof" to the region having a width corresponding to ten cells in terms of the number of the complete cells 35 from the outermost periphery toward the center. When the honeycomb structure has the second region of such a width, a ratio of the second region 15 (a region where a thickness of the partition walls 9 is larger than that in the first region 13) lowers, which can realize the lightening of the honeycomb structure 50 and the lowering of a heat capacity.

In the present description, "the thickness $t_3$ of the partition walls 9 forming the first complete cells 35 from the outermost periphery of the honeycomb structure body 10 toward the center thereof in the second region 15" is the thickness of the partition walls 9 forming the complete cells 35a in the example shown in FIG. 4.

In the present description, "the partition wall central portion length" means a length of a portion of the partition walls 9 which extends in a predetermined width in the cross section perpendicular to the Z-direction of the honeycomb structure body 10.

In the honeycomb structure 50a shown in FIG. 2, an intersecting portion 20 of the partition walls 9 is not a rounded intersecting portion 23, and hence a length of the whole one side of the polygonal (quadrangular) sectional shape of the cell 7 in the cross section perpendicular to the Z-direction of the honeycomb structure body 10 corresponds to "the partition wall central portion length".

In the case of the honeycomb structure 50b shown in FIG. 3, an intersecting portion 20 of partition walls 9 is a rounded intersecting portion 23. In the rounded intersecting portion 23, edges of the partition walls 9 are circularly curved, and accordingly, a thickness of each of the partition walls 9 gradually increases toward an end. In the case of the honeycomb structure 50b, "the partition wall central portion" corresponds to a portion of one side of a polygonal shape (a quadrangular shape) constituting the sectional shape of the cell 7 in the cross section perpendicular to the Z-direction of the honeycomb structure body 10 excluding each end portion of the one side (a portion of the partition wall in each rounded intersecting portion which has a gradually increasing width). In the case of the honeycomb structure 50b, "the partition wall central portion length" is a length of a portion of the partition wall 9 which linearly extends in the predetermined width, i.e., literally the length of the central portion of the one side constituting the quadrangular shape of the sectional shape of the cell 7.

In the present description, "the rounded intersecting portion 23" is the intersecting portion 20 of the partition walls 9 which has a round shape. In the present description, when "the intersecting portion 20 has the round shape", it is meant that the vertex of the polygonal shape constituting the sectional shape of the cell 7 which corresponds to the intersecting portion in the cross section perpendicular to the Z-direction is circularly rounded. For example, in the honeycomb structure 50b shown in FIG. 3, each vertex of the quadrangular shape constituting the sectional shape of the cell 7 is rounded.

In the present description, "the diagonal width Is in the rounded intersecting portion 23" is a minimum width of the partition wall 9 in the intersecting portion 20 separating the cells 7 present at an intersecting position from each other in the rounded intersecting portion 23.

In the honeycomb structure 50, it is preferable that at least one of the intersecting portions 20 of the partition walls 9 is the rounded intersecting portion 23 and the diagonal width Is in the rounded intersecting portion 23 is from 1.5 to 5.5 times the thickness $t_1$. When the honeycomb structure has one or more rounded intersecting portions 23 and the diagonal width Is is smaller than 1.5 times the thickness $t_1$, an effect of suppressing the cell deformation due to the intersecting portion 20 which is the rounded intersecting portion 23 is not sufficiently exerted sometimes. When the honeycomb structure has one or more rounded intersecting portions 23 and the diagonal width Is is in excess of 5.5 times the thickness $t_1$, a weight of the honeycomb structure 50 disadvantageously increases and the heat capacity thereof disadvantageously increases. Furthermore, it is more preferable that in the honeycomb structure 50, 50% of all the intersecting portions 20 are the rounded intersecting portions 23 and the diagonal width Is is from 1.5 to 3.5 times the thickness $t_1$. In particular, it is most preferable that 100% of all the intersecting portions 20 are the rounded intersecting portions 23 and the diagonal width Is is from 1.5 to 3.5 times the thickness $t_1$.

In the honeycomb structure 50, the open area ratio in the first region 13 of the honeycomb structure body 10 is preferably 88% or more. When the open area ratio in the first region 13 of the honeycomb structure body 10 is 88% or more, the further lowering of the heat capacity and the further decrease of a pressure loss can more securely be realized. Furthermore, when the open area ratio in the first region 13 of the honeycomb structure body 10 is preferably 89% or more. Especially, the open area ratio is most preferably 90% or more. In the present description, "the open area ratio in the first region 13 of the honeycomb structure body 10" is a ratio (a percentage) of a total of sectional areas of all the cells 7 present in the first region 13 to a sectional area of the first region 13 of the honeycomb structure body 10 in the cross section perpendicular to the Z-direction of the honeycomb structure body 10.

In the honeycomb structure 50, there is not any special restriction on a sectional shape of the complete cell 35 in the cross section perpendicular to the Z-direction, as long as the shape is the polygonal shape. Furthermore, in the honeycomb structure 50, the sectional shape of the complete cell 35 in the cross section perpendicular to the Z-direction is preferably one of a square shape, a rectangular shape, a rhombic shape and a hexagonal shape. A case where "the sectional shape of the complete cell 35 is one of the square shape, the rectangular shape, the rhombic shape and the hexagonal shape" also corresponds to, for example, a case where in the one honeycomb structure 50, the section shape of the specific complete cell 35 is the square shape and the sectional shape of the other complete cell 35 is the hexagonal shape. Furthermore, a case where "the sectional shape of the cell is the square shape" also corresponds to a case where the above-mentioned basic shape is the square shape and one or more vertexes of the square shape are rounded (have the rounded intersecting portions 23).

Moreover, in the honeycomb structure 50, the honeycomb structure body 10 is preferably made of a ceramic material containing one or more selected from the group consisting of cordierite, alumina, mullite, silicon nitride, and silicon carbide. Furthermore, the honeycomb structure body 10 is more preferably made of a ceramic material containing, as a main composition, one or more selected from the group consisting of cordierite, alumina, mullite, silicon nitride, and silicon carbide. Among these, the honeycomb structure body 10 is most preferably made of a ceramic material containing cordierite as the main component. When cordierite is used as a material of the partition walls 9, the honeycomb structure body has a small thermal expansion coefficient and excellent heat shock resisting properties. It is to be noted that "the main component" mentioned in the present description is contained as much as 50 mass % or more of the whole material. For example, when "cordierite is the main component", it is meant that the honeycomb structure body 10 contains 50 mass % or more of cordierite.

Hereinafter, "the other characteristics" in the honeycomb structure 50 will be described.

In the honeycomb structure 50, the porosity of the partition walls 9 is usually from 20 to 60%. Furthermore, the porosity of the partition walls 9 is preferably from 25 to 55% and more preferably from 25 to 45%. Especially, the porosity is most preferably from 25 to 35%. When the porosity is smaller than 20%, the weight of the honeycomb structure 50 disadvantageously increases and the heat capacity disadvantageously increases. When the porosity is in excess of 60%, the structural strength of the honeycomb structure 50 disadvantageously deteriorates. In the present description, "the porosity of the partition walls" is a value measured by a mercury porosimeter.

In the honeycomb structure 50, the thickness $t_1$ of the partition walls 9 in the first region 13 is usually 0.11 mm or less, preferably 0.09 mm or less, further preferably 0.08 mm or less, and especially preferably 0.07 mm or less. In the case of such a thickness of the partition walls 9, the heat capacity in the honeycomb structure 50 lowers and the increase of the pressure loss can be suppressed.

In the present description, "the thickness of the partition walls 9" means the thickness of the partition walls 9 to define two adjacent cells 7 in the cross section perpendicular to the Z-direction. "The thickness of the partition walls 9" can be measured, for example, by an image analysis device (trade name "NEXIV, VMR-1515" manufactured by Nikon Corp.).

In the honeycomb structure 50, a cell density is preferably from 15 to 140 cells/cm$^2$. Furthermore, the cell density is more preferably from 30 to 120 cells/cm$^2$. Especially, the cell density is most preferably from 45 to 95 cells/cm$^2$. When the cell density is smaller than 15 cells/cm$^2$, a contact area between an exhaust gas and a catalyst is small, and hence there is the fear that a purification performance of the exhaust gas deteriorates. When the cell density is in excess of 140 cells/cm$^2$, the pressure loss is disadvantageously remarkably high sometimes. In the present description, "the cell density" means the number of the cells 7 per unit area (per square centimeter) in the cross section perpendicular to the Z-direction.

In the honeycomb structure 50, from the viewpoint of heightening the structural strength, the outer periphery of the honeycomb structure body 10 may be surrounded by the outer peripheral wall 17. There is not any special restriction on a thickness of the outer peripheral wall 17, but the thickness is preferably from 0.05 to 1.0 mm. When the thickness of the outer peripheral wall 17 is in the above-mentioned range, the increase of the pressure loss can be prevented while suitably maintaining the strength of the honeycomb structure 50.

In the honeycomb structure 50, a material of the outer peripheral wall 17 is preferably the same as in the partition walls 9, but the material may be different.

In the honeycomb structure 50, there is not any special restriction on a shape of the outer peripheral wall 17. The shape of the outer peripheral wall 17 is a cylindrical shape shown in FIG. 1. Additionally, the shape may be a tubular shape in which a sectional shape perpendicular to the Z-direction is elliptic, or a tubular shape in which the sectional shape perpendicular to the Z-direction is a polygonal shape such as a quadrangular shape, a pentangular shape or a hexagonal shape.

2. Manufacturing Method of Honeycomb Structure:

Next, a method of manufacturing the honeycomb structure of the present embodiment will be described. In the manufacturing method of the present embodiment, a kneaded material preparing step, a forming step and a firing step are successively performed to obtain the honeycomb structure. The kneaded material preparing step is a step of mixing forming raw materials containing a ceramic raw material, followed by kneading, to obtain a kneaded material. The forming step is a step of extruding the kneaded material obtained by the kneaded material preparing step into a honeycomb form, and obtaining a honeycomb formed body in which a plurality of cells are formed. The firing step is a step of firing the honeycomb formed body to obtain the honeycomb structure.

2-1. Kneaded Material Preparing Step:

In the kneaded material preparing step, the forming raw materials containing the ceramic raw material are mixed and kneaded to obtain the kneaded material.

The ceramic raw material is preferably at least one selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among the examples of the ceramic raw material, the cordierite forming raw material is preferable. When the cordierite forming raw material is used, the honeycomb structure having the small thermal expansion coefficient and excellent heat shock resisting properties can be obtained. It is to be noted that "the silicon-silicon carbide composite material" is formed by using silicon carbide (SiC) as an aggregate and silicon (Si) as a binding material. "The cordierite forming raw material" is a ceramic raw material blended so as to have a chemical composition in which silica falls in a range of 42 to 56 mass %, alumina falls in a range of 30 to 45 mass % and magnesia falls in a range of 12 to 16 mass %, and the material is fired to become cordierite.

In the manufacturing method of the present embodiment, the forming raw material may include a pore former, a dispersion medium, an additive and the like in addition to the ceramic raw material.

An example of the dispersion medium is water. Examples of the additive include an organic binder and a surfactant. A content of the dispersion medium is preferably from 30 to 150 parts by mass to 100 parts by mass of the ceramic raw material.

Examples of the organic binder include methylcellulose, hydroxypropoxyl cellulose, hydroxyethylcellulose, carboxymethylcellulose, and polyvinyl alcohol. Among these binders, methylcellulose and hydroxypropoxyl cellulose are preferably used together. A content of the organic binder is preferably from 1 to 10 parts by mass to 100 parts by mass of the ceramic raw material.

As the surfactant, ethylene glycol, dextrin, fatty acid soap, polyalcohol or the like can be used. One of these surfactants may be used alone or any combination of two or more of the surfactants may be used. A content of the surfactant is preferably from 0.1 to 5.0 parts by mass to 100 parts by mass of the ceramic raw material.

In the kneaded material preparing step, there is not any special restriction on a method of kneading the forming raw material to form the kneaded material, and an example of the method is a method using a kneader, a vacuum clay kneader or the like.

2-2. Forming Step:

In the forming step, the kneaded material obtained in the kneaded material preparing step is extruded into the honeycomb form to obtain the honeycomb formed body. In this honeycomb formed body, a plurality of cells passing through the honeycomb formed body are formed. The extrusion-forming can be performed by using a die. Concerning the die, there may suitably be designed a cell shape, a shape of intersecting portions of partition walls (e.g., a shape of each rounded intersecting portion) and a partition wall thickness in the honeycomb formed body; and a slit shape (a shape of each pin surrounded with a slit), a slit width and a density of the pins in accordance with the cell density; and the like. As a material of the die, a hard metal which does not easily wear is preferable.

2-3. Firing Step:

In the firing step, the honeycomb formed body obtained in the above-mentioned forming step is fired, to obtain the honeycomb structure. The honeycomb structure obtained in this way includes partition walls to define and form a plurality of cells that become through channels of a fluid. Furthermore, when the pore former is included in the above-mentioned forming raw materials, the partition walls are porous walls in which numerous fine pores are formed.

In the firing step of the manufacturing method of the present embodiment, a firing temperature can suitably be determined in accordance with the material of the honeycomb formed body. For example, when the material of the honeycomb formed body is cordierite, the firing temperature is preferably from 1380 to 1450° C. and further preferably from 1400 to 1440° C. Furthermore, a firing time is preferably from about three to ten hours.

In the manufacturing method of the present embodiment, the honeycomb formed body may be dried prior to the firing. There is not any special restriction on a drying method, but examples of the method include hot air drying, microwave drying, dielectric drying, reduced pressure drying, vacuum drying, and freeze drying. Among these methods, the dielectric drying, the microwave drying or the hot air drying is preferably performed alone or as any combination.

EXAMPLES

Hereinafter, the present invention will be described in more detail on the basis of examples, but the present invention is not limited to these examples.

Example 1

As cordierite forming raw materials, alumina, aluminum hydroxide, kaolin, talc and silica were used. To 100 parts by mass of the cordierite forming raw materials, 5 parts by mass of a pore former, 85 parts by mass of water (a dispersion medium), 8 parts by mass of water-absorbing hydroxypropyl methylcellulose (an organic binder) and 3 parts by mass of a surfactant were added. Afterward, mixing was performed, and kneading was further performed, to obtain a kneaded material.

Next, the kneaded material was extruded by using a predetermined die to obtain a honeycomb formed body. In the honeycomb formed body, quadrangular cells were formed in a cross section perpendicular to an extending direction of the cells, and the whole shape was a columnar shape. Then, the obtained honeycomb formed body was dried by a microwave drier. Afterward, the body was further dried completely by a hot air drier. Next, both end surfaces of the dried honeycomb formed body were cut, to regulate the body into a predetermined dimension.

The honeycomb formed body obtained in this way was further fired at 1410 to 1440° C. for five hours to obtain a honeycomb structure.

As to the obtained honeycomb structure, a diameter in the cross section perpendicular to a Z-direction was 172.0 mm, and a length in the Z-direction was 203.2 mm. Respective conditions in the honeycomb structure are shown in Table 1.

Examples 2 to 16 and Comparative Examples 1 to 15

As to honeycomb structures of Examples 2 to 16 and Comparative Examples 1 to 15, the procedures of Example 1 were repeated except that respective conditions were changed as shown in Table 1, to manufacture the honeycomb structures.

TABLE 1

| | Width of second region*[1] | Partition wall thickness $t_1$ (mm) | Partition wall thickness $t_3$ (mm) | $t_3/t_1$ | First region cell pitch p (mm) | Partition wall central portion length Ls (mm) | Partition wall strength index A | Rounded intersection portion diagonal width Is (mm) | $ls/t_1$ | Open area ratio (%) | Porosity (%) | Amount of material to be extruded per unit time (%)*[2] | Isostatic strength (MPa) | General judgment |
|---|---|---|---|---|---|---|---|---|---|---|---|---|---|---|
| Example 1 | 10 | 0.109 | 0.134 | 1.23 | 1.27 | 1.041 | 11.0 | 0.204 | 1.87 | 83.5 | 35 | 150 | 5.1 | ○ |
| Example 2 | 10 | 0.109 | 0.149 | 1.37 | 1.27 | 1.041 | 11.0 | 0.204 | 1.87 | 83.5 | 35 | 150 | 5.0 | ○ |
| Example 3 | 10 | 0.089 | 0.114 | 1.28 | 1.27 | 1.061 | 7.0 | 0.175 | 1.97 | 86.5 | 35 | 150 | 3.5 | ○ |
| Example 4 | 10 | 0.089 | 0.114 | 1.28 | 1.27 | 1.061 | 7.0 | 0.175 | 1.97 | 86.5 | 60 | 150 | 2.8 | ○ |
| Example 5 | 10 | 0.089 | 0.114 | 1.28 | 1.27 | 1.061 | 7.0 | 0.175 | 1.97 | 86.5 | 20 | 150 | 3.9 | ○ |
| Example 6 | 3 | 0.089 | 0.114 | 1.28 | 1.27 | 1.061 | 7.0 | 0.175 | 1.97 | 86.5 | 35 | 150 | 3.2 | ○ |
| Example 7 | 20 | 0.089 | 0.114 | 1.28 | 1.27 | 1.061 | 7.0 | 0.175 | 1.97 | 86.5 | 35 | 150 | 3.8 | ○ |
| Example 8 | 10 | 0.064 | 0.079 | 1.24 | 0.85 | 0.663 | 9.2 | 0.140 | 2.20 | 85.6 | 35 | 150 | 3.9 | ○ |
| Example 9 | 10 | 0.064 | 0.089 | 1.39 | 0.85 | 0.663 | 9.2 | 0.140 | 2.20 | 85.6 | 35 | 150 | 4.1 | ○ |
| Example 10 | 10 | 0.064 | 0.079 | 1.24 | 1.08 | 0.000 | 5.0 | 0.140 | 2.20 | 88.6 | 35 | 150 | 2.8 | ○ |
| Example 11 | 10 | 0.064 | 0.089 | 1.39 | 1.08 | 0.900 | 5.0 | 0.140 | 2.20 | 88.6 | 35 | 150 | 2.9 | ○ |
| Example 12 | 10 | 0.051 | 0.066 | 1.30 | 1.04 | 0.786 | 4.2 | 0.155 | 3.04 | 90.4 | 35 | 150 | 1.9 | ○ |
| Example 13 | 10 | 0.051 | 0.061 | 1.20 | 1.04 | 0.786 | 4.2 | 0.155 | 3.04 | 90.4 | 35 | 150 | 2.0 | ○ |
| Example 14 | 10 | 0.051 | 0.071 | 1.39 | 1.04 | 0.786 | 4.2 | 0.155 | 3.04 | 90.4 | 35 | 150 | 2.0 | ○ |
| Example 15 | 10 | 0.051 | 0.066 | 1.30 | 1.04 | 0.486 | 10.9 | 0.279 | 5.49 | 90.4 | 35 | 150 | 2.1 | ○ |
| Example 16 | 10 | 0.051 | 0.066 | 1.30 | 1.04 | 0.786 | 4.2 | 0.155 | 3.04 | 90.4 | 20 | 150 | 2.3 | ○ |
| Comparative Example 1 | 10 | 0.109 | 0.120 | 1.10 | 1.27 | 1.041 | 11.0 | 0.204 | 1.87 | 83.5 | 35 | 150 | 1.2 | X |
| Comparative Example 2 | 10 | 0.109 | 0.159 | 1.46 | 1.27 | 1.041 | 11.0 | 0.204 | 1.87 | 83.5 | 35 | 150 | 1.1 | X |
| Comparative Example 3 | 10 | 0.109 | 0.159 | 1.46 | 1.18 | 0.955 | 13.1 | 0.204 | 1.87 | 82.4 | 35 | 150 | 1.3 | X |
| Comparative Example 4 | 10 | 0.089 | 0.104 | 1.17 | 1.27 | 1.061 | 7.0 | 0.175 | 1.97 | 86.5 | 35 | 150 | 0.9 | X |
| Comparative Example 5 | 10 | 0.089 | 0.134 | 1.51 | 1.27 | 1.061 | 7.0 | 0.175 | 1.97 | 86.5 | 35 | 150 | 1.0 | X |
| Comparative Example 6 | 10 | 0.089 | 0.114 | 1.28 | 1.27 | 1.061 | 7.0 | 0.175 | 1.97 | 86.5 | 65 | 150 | 1.2 | X |
| Comparative Example 7 | 2 | 0.089 | 0.114 | 1.28 | 1.27 | 1.061 | 7.0 | 0.175 | 1.97 | 86.5 | 35 | 150 | 1.2 | X |
| Comparative Example 8 | 10 | 0.064 | 0.074 | 1.16 | 1.08 | 0.900 | 5.0 | 0.140 | 2.20 | 88.6 | 35 | 150 | 0.7 | X |
| Comparative Example 9 | 10 | 0.064 | 0.094 | 1.47 | 1.08 | 0.900 | 5.0 | 0.140 | 2.20 | 88.6 | 35 | 150 | 0.7 | X |
| Comparative Example 10 | 10 | 0.064 | 0.079 | 1.24 | 1.08 | 1.020 | 3.9 | 0.090 | 1.41 | 88.6 | 35 | 150 | 0.8 | X |
| Comparative Example 11 | 10 | 0.051 | 0.059 | 1.16 | 1.04 | 0.786 | 4.2 | 0.155 | 3.04 | 90.4 | 35 | 150 | 0.3 | X |
| Comparative Example 12 | 10 | 0.051 | 0.073 | 1.43 | 1.04 | 0.786 | 4.2 | 0.155 | 3.04 | 90.4 | 35 | 150 | 0.4 | X |
| Comparative Example 13 | 10 | 0.051 | 0.066 | 1.30 | 1.04 | 0.866 | 3.4 | 0.122 | 2.30 | 90.4 | 35 | 150 | 0.3 | X |
| Comparative Example 14 | 10 | 0.051 | 0.066 | 1.30 | 1.04 | 0.786 | 4.2 | 0.155 | 3.04 | 90.4 | 65 | 150 | 0.8 | X |
| Comparative Example 15 | 10 | 0.109 | 0.120 | 1.10 | 1.27 | 1.041 | 11.0 | 0.204 | 1.87 | 83.5 | 35 | 100 | 4.9 | X |

*[1]Width in terms of the number of the cells from the outermost periphery
*[2]Value obtained by using Comparative Example 15 as a reference (100%)

As to the honeycomb structures of Examples 1 to 16 and Comparative Examples 1 to 15, [Porosity], [Amount of Material to be Extruded per Unit Time] and [Isostatic Strength] were evaluated (the results are shown in Table 1). Evaluating methods of the respective evaluations will be described in the following.

[Porosity (%)]

A porosity (%) in each honeycomb structure was measured by a mercury porosimeter (mercury intrusion technique). As the mercury porosimeter, trade name: Auto Pore III type 9405 manufactured by Micromeritics Co. was used.

[Amount of Material to be Extruded Per Unit Time]

Time until a formed body of a predetermined length was extruded from a die was measured, and an amount of a material to be extruded per unit time was calculated from the measured time. Concerning Examples 1 to 16 and Comparative Examples 1 to 14, values obtained by using "the amount of the material to be extruded per unit time" of the honeycomb structure of Comparative Example 15 as a reference (100%) are shown in Table 1. Additionally, the amount of the material to be extruded per unit time in Comparative Example 15 was 100 kg/hr.

[Isostatic Strength]

The measurement of the isostatic strength was performed on the basis of an isostatic breaking strength test stipulated by M505-87 of Car Standards issued by the Society of Automotive Engineers of Japan (JASO Standards). The isostatic breaking strength test is a test carried out by placing a honeycomb structure in a tubular container of rubber, closing the container with a lid of a plate made of aluminum, and performing isotropic pressurizing compression in water. That is, in the isostatic breaking strength test, a compressive load in a case where the outer peripheral surface of the honeycomb structure is held is simulated and applied to a can member. The isostatic strength measured by this isostatic breaking strength test is shown by an applied pressure value (MPa) when the honeycomb structure breaks.

[Judgment]

When "the isostatic strength" was 1.5 MPa or more and "the amount of the material to be extruded per unit time" was higher than 100% (Comparative Example 15 was the reference), this case was judged as "pass" (shown by a round mark in Table 1). When the isostatic strength was smaller than 1.5 MPa or "the amount of the material to be extruded per unit time" was 100% or less (Comparative Example 15 was the reference), this case was judged as "failure" (shown by a cross mark in Table 1).

INDUSTRIAL APPLICABILITY

The present invention can be utilized as a honeycomb structure capable of suppressing cell deformation while realizing the lowering of a heat capacity and the decrease of a pressure loss.

DESCRIPTION OF REFERENCE SYMBOLS

3: first end surface, 5: second end surface, 7: cell, 9: partition wall, 10: honeycomb structure body, 13: first region, 15: second region, 17: outer peripheral wall, 20: intersecting portion, 23: rounded intersecting portion, 31: incomplete cell, 35 and 35a to 35d: complete cell, and 50, 50a and 50b: honeycomb structure.

What is claimed is:

1. A honeycomb structure comprising a honeycomb structure body having partition walls to define and form a plurality of cells extending from a first end surface as one end surface to a second end surface as the other end surface to become through channels of a fluid,
wherein in a cross section perpendicular to an extending direction of the cells, the honeycomb structure body is constituted of a first region which is an inside region and a second region which is an outside region surrounding a periphery of the first region, and
in the cross section perpendicular to the cell extending direction, the cells of a part positioned in the outermost periphery of the honeycomb structure body among the plurality of cells are incomplete cells in which a part of an outer periphery of a cross section of each of the cells has a shape along an outer peripheral shape of the honeycomb structure body,
the cells other than the incomplete cells among the plurality of cells are complete cells having a polygonal sectional shape in the cross section perpendicular to the cell extending direction,
the second region is from a region having a width corresponding to three cells in terms of the number of the complete cells from the outermost periphery of the honeycomb structure body toward a center thereof to a region having a width corresponding to 20 cells in terms of the number of the complete cells from the outermost periphery toward the center,
an open area ratio in the first region of the honeycomb structure body is 83% or more,
a porosity of the partition walls is from 20 to 60%,
a thickness $t_1$ of the partition walls constituting the first region is 0.11 mm or less,
a thickness $t_2$ of the partition walls constituting the second region is larger than the thickness $t_1$ of the partition walls,
a value ($t_3/t_1$) of a ratio between a thickness $t_3$ of the partition walls forming the first complete cells from the outermost periphery of the honeycomb structure body toward the center thereof in the second region and the thickness $t_1$ of the partition walls is from 1.2 to 1.4,
a partition wall strength index A represented by Equation (1) described in the following in the first region is 4.0 or more, $$A=t_1^2/Ls^2 \times 1000, \qquad \text{Equation (1):}$$

where A is the partition wall strength index, and Ls is a partition wall central portion length (mm), and
at least 50% of the intersecting portions of the partition walls defining the complete cells are rounded intersecting portions having a round shape, where Ls is calculated in accordance with Equation (2), $$Ls=p-t_1-(Is-2^{1/2}t_1)/(2^{1/2}-1), \qquad \text{Equation (2):}$$

where p is a cell pitch (mm), Is is a diagonal width (mm) in each of the rounded intersecting portions, and Is is from 1.5 to 5.5 times the thickness $t_1$.

2. The honeycomb structure according to claim 1, wherein the open area ratio in the first region of the honeycomb structure body is 88% or more.

3. The honeycomb structure according to claim 2, wherein the second region is from the region having the width corresponding to the three cells in terms of the number of the complete cells from the outermost periphery of the honeycomb structure body toward the center thereof to a region having a width corresponding to ten cells in terms of the number of the complete cells from the outermost periphery toward the center.

4. The honeycomb structure according to claim 3, wherein in the cross section perpendicular to the cell extending direction, the sectional shape of the complete cells is one of a square shape, a rectangular shape, a rhombic shape and a hexagonal shape.

5. The honeycomb structure according to claim 2, wherein in the cross section perpendicular to the cell extending direction, the sectional shape of the complete cells is one of a square shape, a rectangular shape, a rhombic shape and a hexagonal shape.

6. The honeycomb structure according to claim 1, wherein the second region is from the region having the width corresponding to the three cells in terms of the number of the complete cells from the outermost periphery of the honeycomb structure body toward the center thereof to a region having a width corresponding to ten cells in terms of the number of the complete cells from the outermost periphery toward the center.

7. The honeycomb structure according to claim 6, wherein in the cross section perpendicular to the cell extending direction, the sectional shape of the complete cells is one of a square shape, a rectangular shape, a rhombic shape and a hexagonal shape.

8. The honeycomb structure according to claim 1, wherein in the cross section perpendicular to the cell extending direction, the sectional shape of the complete cells is one of a square shape, a rectangular shape, a rhombic shape and a hexagonal shape.

9. The honeycomb structure according to claim 1, wherein the honeycomb structure body is made of a ceramic material containing one or more selected from the group consisting of cordierite, alumina, mullite, silicon nitride, and silicon carbide.

* * * * *